Patented June 30, 1953

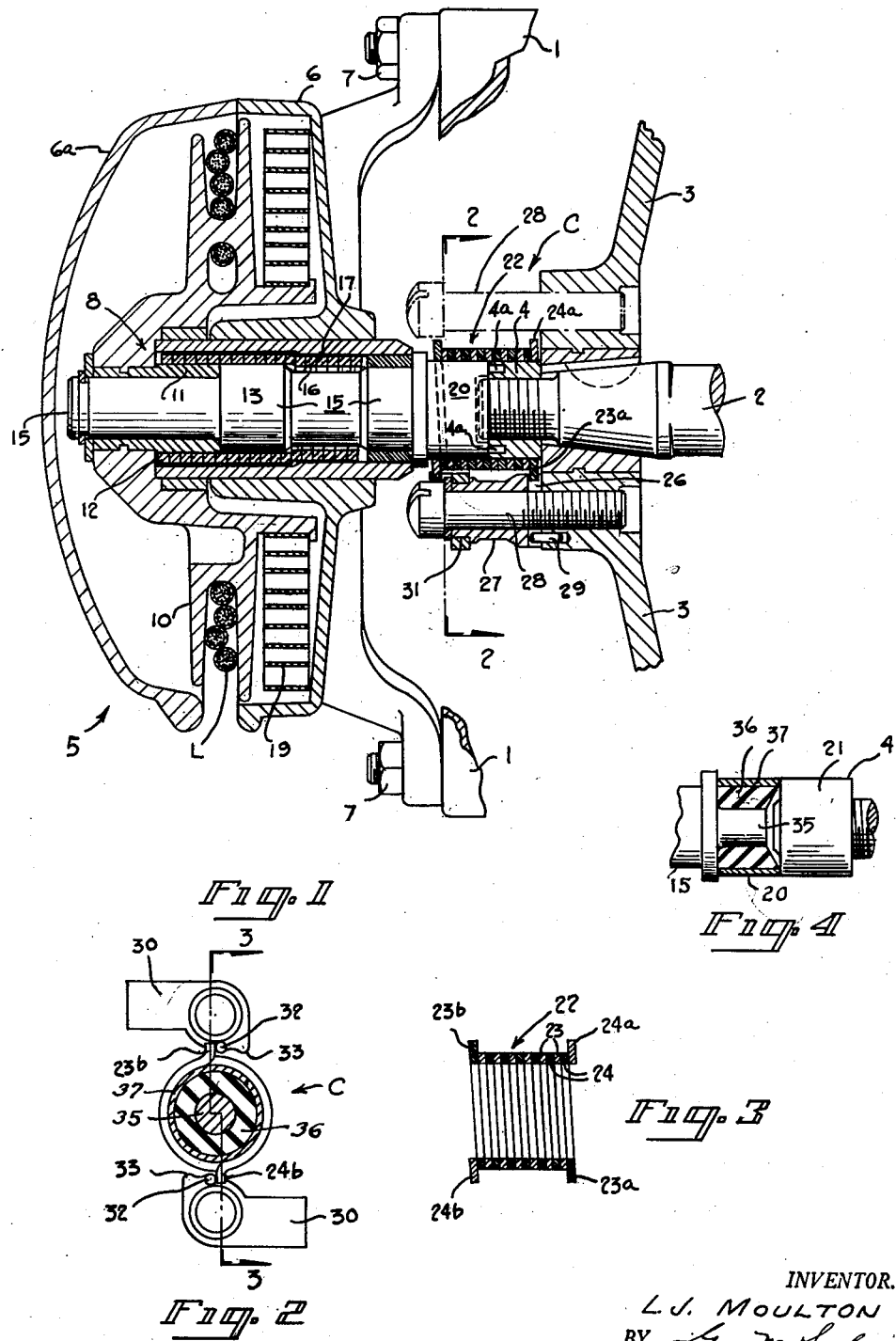

2,643,750

UNITED STATES PATENT OFFICE 2,643,750

SPRING CLUTCH TYPE COUPLING

Lloyd Jackson Moulton, Mentor, Ohio, assignor to The Marquette Metal Products Company, Cleveland, Ohio, a corporation of Ohio Application October 24, 1951, Serial No. 252,962

5 Claims. (Cl. 192—48)

The invention relates principally to an improvement in torque transmitting couplings for aligned rotary members which couplings are releasable as a function of speed. More specifically the invention provides a simple, dynamically balanced normally locked friction coil, torque-transmitting, coupling between a pair of relatively rotatable members wherein transmission is interrupted automatically upon attainment of a predetermined rotational speed on part of the members.

The embodiment of the invention illustrated herewith serves as a centrifugally released coupling between a manually operated, retriever type, cranking mechanism for a portable, high speed internal combustion engine and the crankshaft of the engine. The cranking mechanism includes an already known arrangement of friction coil clutch which operates as a silent overrunning or ratchet action coupling between a driving drum and a driven drum of the clutch to enable transmission of each starting impulse to the engine from a driving-drum-connected reel to which a pull cord or lanyard is attached. A retriever spring is connected to the reel to return the lanyard, after release of pulling force thereon, as enabled by the overrunning action of the clutch. The starter clutch coil, in the illustrated arrangement, after engine starting has been accomplished, and the reel has been returned to its initial position by the retriever spring, would, in the absence of special provision to prevent it, continually overrun on the driven drum which transmits the cranking torque to the engine. In order to avoid excessive clutch heat and wear, provision is made for disconnecting the driven drum or output member of the starter clutch from the crankshaft during normal operation of the engine.

Heretofore in the particular engine and starter combination for which the present subject improvement was designed, pivoted, spring biased, ratchet pawls are, in effect, carried by the engine crankshaft for co-operation with generally radial abutments on the output member of the starter clutch, and, as soon as the engine has been started, centrifugal force acts on the pawls to hold them in disengaged position against the return force of their biasing springs. The pawls necessarily have some idle movement or backlash the amplitude of which, at starting, varies at random according to the initial relative angular position of the ratchet elements. It is fairly common for operators habitually to neglect to take up the lost motion before exerting sudden pulling force on the lanyard, and, in the course of time, considerable damage due to impact is done to the ratchet driving faces and to various other parts of the mechanism.

In the present coupling arrangement the backlash in the starting direction is eliminated and the speed-change-responsive elements necessary for release do not carry any part of the load and are never subjected to impact or percussive force. Additionally, when desired, the coupling can have its principal components so interrelated that slight misalignment of the starter output element and the crankshaft will not adversely affect the coupling or its operation.

The principal objects of the invention are generally indicated by the foregoing discussion. Others will be mentioned in or made apparent from the following description of the illustrated embodiments.

In the drawing Fig. 1 is a fragmentary central sectional assembly view of an engine starter mechanism and crankshaft (partly shown) including the centrifugally releasing coupling hereof. Fig. 2 is a transverse sectional view substantially as indicated at 2—2 on Fig. 1. Fig. 3 is a central sectional view of a compound (two piece) coil element of the coupling. Fig. 4 is a fragmentary sectional detail view showing the preferred manner of making one drum portion of the coupling.

Small portions of the engine housing are shown at 1, Fig. 1, a forward end portion of the crankshaft is shown at 2 and a central portion of the flywheel at 3. The flywheel, as shown, is keyed to the crankshaft, being retained in mounted position by a threaded nut 4 shown as operable by a spanner wrench engaging parallel holes 4a in the nut.

The starter unit 5, as shown, has its own casing 6, 6a which is suitably fastened to the engine housing as by bolts 7 so that the various rotary elements of the starter spring clutch assembly 8 are substantially aligned with the crankshaft. Unit 5 is intended to be essentially the starter mechanism shown and described in Machine Design for August 1949, pages 107, 108 (chain saw made by McCulloch Motors Corporation). The metal parts which are adapted to be made by casting (housing portions and others) are assumed to be magnesium in order to minimize the weight of the machine.

A steel sleeve 11, integral with lanyard reel 10, serves as the driving drum of starter clutch 8 on which associated coils of a helical, metal clutch spring 12 are preloaded. Other coils are preloaded against drum surface 13 of the output member, namely shaft 15, of the starter clutch. Mainly as a backfire release (principle explained in Gorske et al. Patent 2,486,149, October 25, 1949) a group of coils 16 are preloaded in a stationary sleeve 17 mounted in starter casing section 6. Those coils overrun in sleeve 17 when the lanyard reel is turned in the starting direction, i. e. clockwise as viewed from the left, Fig. 1. The coils 16 snub or lock tightly in the sleeve 17 when, for example, the lanyard is being reeled in by action of the retriever spring 19, compelling an overrunning action to take place between the driving drum sleeve 11 and the associated spring coils.

The subject coupler C includes a provision of a cylindrical drum surface portion 20 on the end of the starter torque output shaft 15 adjacent the engine. Drum surface 20 and an identical diameter drum surface 21 on the crankshaft (e. g. flywheel securing nut 4 providing the surface 21 in this case), are bridged by the coils of overrunning, self energizing clutch spring coil assembly 22 anchored to the crankshaft. As shown the spring assembly 22 comprises two separate identical coil members 23 and 24 interwound with each other and with their terminal portions so related that the assembly is dynamically balanced. Such balance, in the illustrated two part coil assembly, results from so designing and mounting the coils that the four coil end portions lie in a commonplace congruent with the axis of rotation. The coil end portions, for reasons given later, are shown as identical outwardly bent toes 23a, 23b and 24a, 24b; and each operating pair of toes (e. g. pair 23b and 24b) are diametrically opposite each other. The toes at each end being equally spaced apart circumferentially and symmetrically related in pairs mutually counterbalance the various portions of the assembly. The toes need not comprise integral portions of the coil stock.

Toes 23a and 24a (Figs. 1, 2 and 3) serve to anchor the individual coils to the crankshaft and flywheel assembly by entering, for example, cross slots 26 of sleeves 27 mounted on the hub portion of the flywheel 3 as by parallel screws or studs 28 diametrically opposite each other and entering the sleeves and the hub. Only one sleeve and mounting screw assembly is fully illustrated, the other being identical thereto. Each sleeve 27 is prevented from turning about the axis of mounting screw 28 as by a pin 29 transversely fitting slot 26 in the sleeve.

With the design and arrangement thus far described, clutch spring release toes (pair 23b and 24b) are held in position 180° apart about the axis of the shaft 15 and its drum surface 20 as shown in Fig. 2. Flyweights 30 are symmetrically and pivotally mounted on the screw and sleeve assembly, as on shouldered forwardly disposed reduced end portions 31 of the sleeves 27, for free but limited pivotal movement. Each flyweight has a spring releasing abutment 32 in operating juxtaposition to a respective spring release toe 23b or 24b. To limit the springreleasing pivotal movement of the flyweights, arm portions 33 thereof abut outer peripheral spring coil surfaces as will be apparent from Fig. 2.

If, due to flexure of the magnesium casing of the starter unit 5 or to warping or faulty manufacture, the starter clutch output shaft 15 and the crankshaft 2 are or become slightly out of alignment, the clutch drum surfaces 20 and 21 may nevertheless be permitted to remain coaxial during operation of the coupler clutch coil assembly 22 by providing a support for one of the clutch drum surfaces enabling it yieldably to move transversely of its normal axis. Fig. 4 shows a flexible mounting for drum surface 20 on shaft 15. The shaft has a stub portion 35 surrounded by a rubber or elastomer ring 36 which is the sole radial support for a steel sleeve 37 on which the drum surface 20 is formed. The rubber or elastomer ring 36 is bonded firmly to the stub and sleeve so as to transmit the necessary engine starting torque to the compound clutch spring 22 and thence to the crankshaft. The resilient material of the ring 36 is so related to the adjacent portions of the coupling assembly as to allow slight shifting of the drum sleeve 37 relative to the supporting stub 35 while continuing to transmit starting torque to the crankshaft.

In operation, with the engine at standstill, a pull of sufficient force on the lanyard L, assuming it is wholly or partially reeled in at the time, results in immediate turning of the crankshaft 2 with no lost motion. The flyweight masses and effective lever lengths are so selected that releasing action on the coils of spring 22 cannot take place until the crankshaft is turning at far higher than maximum starting speed but so that release does take place somewhat below the minimum running speed of the engine. The permitted spring releasing movements of the flyweights should be of such amplitude that all the coils around drum surface 20 are moved free of that surface. The coils around drum surface 21 can just as well remain seated on that surface or part of it at all engine speeds. Those coils could, incidentally, be reduced in number since their sole function is to protect the toes 23a and 24a from having to transmit starting torque, leaving as their sole function the maintenance of a proper angular relationship between the release toes (23b and 24b) and the flyweights.

At least for some purposes the individual clutch springs 23 and 24 could of themselves provide the necessary masses for releasing operation by centrifugal force. The flyweights could, as a further suggested modification, operate to change the axial length of the spring assembly in order to cause the releasing operation to take place at the desired speed.

I claim:

1. A coil clutch device adapted for centrifugal release action, comprising two coaxial rotary members and a friction coil assembly including a plurality of interwound helical friction coil elements of equal diameter each anchored to one of the members to turn always therewith, free end coils of said elements being preloaded on a drum portion of the other member so as to be self energizing thereon to transmit torque and be releasable therefrom by centrifugal force, the terminals of the free end coils being equidistantly spaced circumferentially of the rotational axis and in the same plane transverse to said axis for dynamic balance.

2. The device according to claim 1, wherein the terminals of the free end coils are outwardly bent release toe portions of the coils and the device includes flyweights symmetrically disposed about said axis and pivotal mounting means for the flyweights supported rigidly by the rotary member to which the coil assembly is anchored, the flyweights having coil releasing shoulders cooperable with respective toe portions of the coil elements to release them at a predetermined speed of the device.

3. The device according to claim 1 wherein the coil assembly comprises two interwound coil elements each with a release toe at its free end and each with an anchor toe at the end opposite the release toes, and wherein flyweight means carried by said one member act on the release toes to disconnect the clutch device at a predetermined speed of rotation of the assembly further characterized in that the release toes and anchor toes of the two coil elements lie in a common plane congruent with the axis of rotation of the device whereby the coil assembly is dynamically balanced.

4. In combination with an engine starter clutch and engine crankshaft, wherein the starter clutch has a torque output element in the form of a drum and the crankshaft has a normally coaxial torque receiving element in the form of a similar drum, a plurality of interwound clutching coils each anchored at one end to the receiving element and free at the opposite end but preloaded on the clutch output drum for self energizing coupling action and centrifugal release action in respect to the drums.

5. The combination according to claim 4, wherein one of the drums includes a rubber or elastomer body capable of carrying the starting torque delivered by the starter clutch and the coil-contacting surface of that drum is formed on a metal sleeve bonded to said body.

LLOYD JACKSON MOULTON.

References Cited in the file of this patent

UNITED STATES PATENTS

| Number | Name | Date |
| --- | --- | --- |
| 1,966,267 | Starkey | July 10, 1934 |
| 2,084,761 | Bradley | June 22, 1937 |
| 2,251,804 | Reuter et al. | Aug. 5, 1941 |
| 2,486,149 | Gorske et al. | Oct. 25, 1949 |